United States Patent Office 3,594,183
Patented July 20, 1971

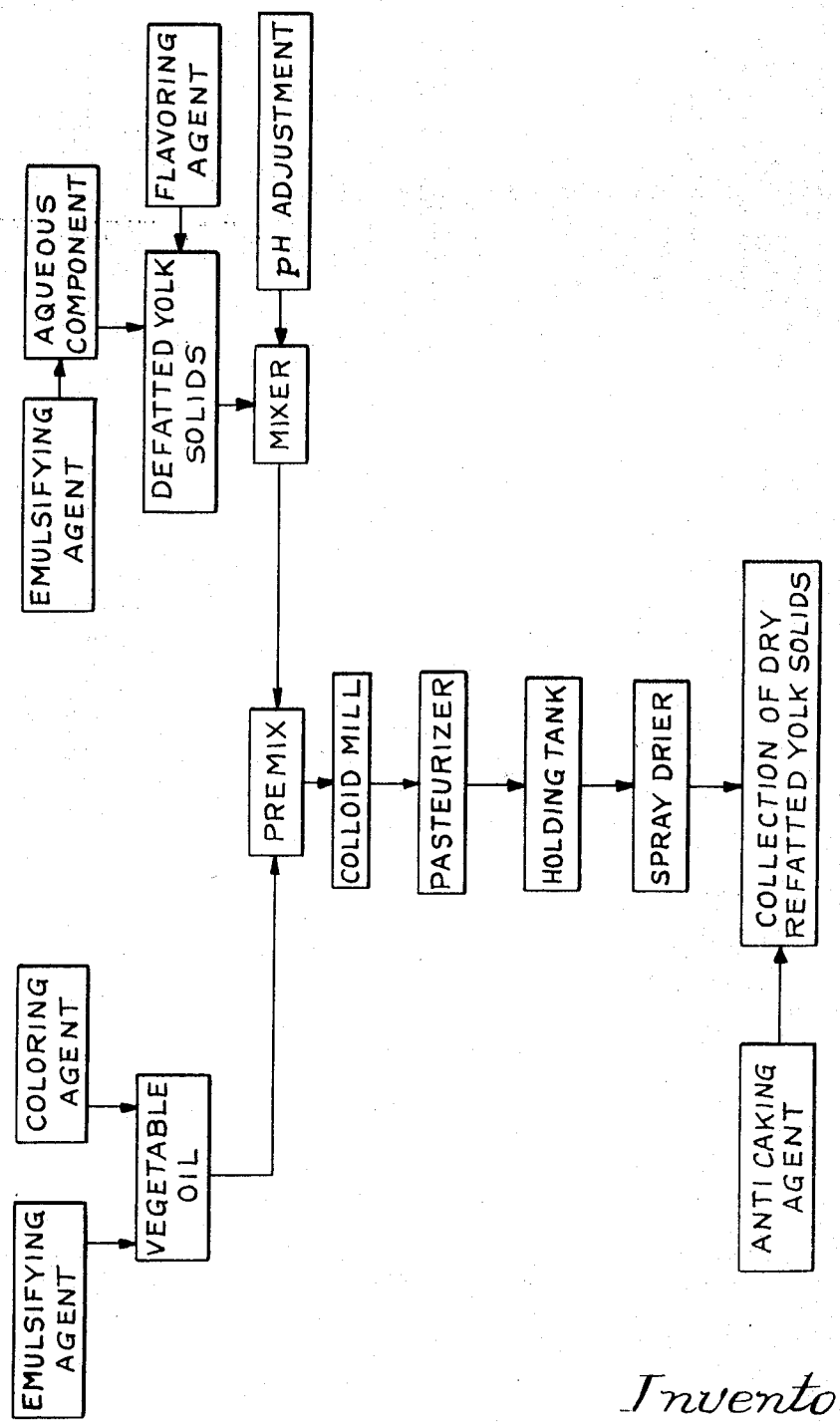

---

3,594,183
EGG FOOD PRODUCT AND PROCESS FOR THE PREPARATION THEREOF
Daniel Melnick, Teaneck, Marcus I. Wegner, Tenafly, and David R. Davis, Somerville, N.J., assignors to CPC International Inc.
Filed Aug. 31, 1967, Ser. No. 664,674
Int. Cl. A23l 1/10, 1/32
U.S. Cl. 99—94    29 Claims

---

ABSTRACT OF THE DISCLOSURE

Egg yolk containing products which are high in polyunsaturates and low in cholesterol content. Egg yolk solids, from which not all but a major part of the fat and cholesterol have been extracted, are mixed with vegetable oil, salt, emulsifiers, and coloring compounds. After this mixture has been emulsified, pasteurized and spray dried, substantially dry, discrete particles of refatted egg yolk solids are recovered. These refatted egg yolk solids may be used as a replacement for conventional egg yolk solids, or when admixed with the proper proportion of egg white solids, used as a replacement for whole egg solids. Further, these refatted egg yolk solids, when combined in the proper proportions with egg white solids, non-fat milk solids, an alkaline material, baking powder, vegetable gum, and sugar and spices, may be cooked after rehydration with water, to yield a scrambled egg or omelet product. Vegetable oil is used for refatting, preferably corn oil, because of its high ratio of polyunsaturates to saturates. The resulting refatted egg yolk product is particularly suitable for consumption by those requiring foods that are low in cholesterol and/or rich in polyunsaturates.

---

This invention relates to novel food products based on dry egg yolk solids and to processes for making them.

It has long been recognized that eggs are a most desirable food in contributing to the nutritional requirements of man. Eggs are a remarkable biological product, as evidenced by their many important functions, including binding, clarifying, extending, leavening, thickening, and emulsifying in food products. Eggs are further used in many areas of cookery for enhancing and improving such quality indices as color, texture, flavor and nutrition.

The liquid portion of the whole eggs consists of about 64% white and 36% yolk. The egg white or egg albumen is essentially an aqueous solution of proteins containing small amounts of other materials such as minerals and sugars, and only a trace of fat. The egg yolk, on the other hand, contains virtually all of the fat and cholesterol of whole eggs. These latter compounds are present in combination with egg yolk proteins, as complex lipoprotein compounds. Consequently, many of the functions and nutritional aspects of the egg reside specifically in the yolk portion. This is evidenced by the incorporation of the yolk alone, as an ingredient in many basic food formulations.

In the past few years, much emphasis has been placed on the desirability of reducing the amount of the more saturated fats and replacing them with polyunsaturated fats in the human diet. Recent medical evidence indicates that high serum cholesterol content may be linked to diseases of the vascular system. The evidence further shows that dietary cholesterol from egg yolks is more effective in raising serum cholesterol levels than an equivalent amount of cholesterol incorporated as such in the diet. It is for this reason that many physicians and nutritionists frequently limit the quantities of eggs to be consumed by patients showing a tendency toward high serum cholesterol levels.

The modification or alteration of eggs to substantially increase the polyunsaturated fat to saturated fat ratio and to significantly decrease the cholesterol content would allow persons who choose to control their serum cholesterol content through dietary changes to continue to enjoy the nutritional benefits of the egg, without any loss of the desirable functional and organoleptic qualities of natural eggs. Heretofore, no satisfactory product has been developed.

Moreover, dry egg solids and many products which contain them, tend to have poor flavor as produced and poor flavor stability upon storage for long periods of time. For this reason, there has never been a dry egg product suitable for the preparation of scrambled eggs or of omelets of adequate flavor acceptability.

One recent approach by others to the problem involved decreasing the saturated fat content and increasing the polyunsaturated fat content of egg yolks through changing the diet of the hens. Although the fatty acid composition of the yolk is indeed, markedly influenced by the type of fat in the diet of the hens, the cholesterol content of the yolk has been found to be essentially independent of the type of fat used in the diet of the hens. In fact, the cholesterol level of the egg yolk may increase as the degree of unsaturation of the dietary fat increases. Such eggs are no improvement over conventional eggs in controlling the serum cholesterol level.

Another approach to the problem involved providing the consumer with an egg-like product, free of cholesterol, through the inclusion in the formulation of an imitation "yolk" which contains no natural yolk material at all, but is fabricated from vegetable sources. This product, after hydration and frying, is very different from scrambled eggs in odor, texture, and taste and has been found to be unacceptable to many users.

It appeared that the problem might be approached by refatting defatted egg yolk of a special type. Since all of the cholesterol and substantially all of the fat in the egg is in the egg yolk, only that portion of the egg need be modified.

One object of the present invention is to provide useful egg food products and practical processes for making them.

Another object of the invention is to provide new egg food products and foods based upon them that are characterized by superior flavor stability.

A further object of the present invention is to provide an egg product which is quickly and economically prepared for eating.

It is another object of the present invention to provide a cooked egg product superior in flavor and at least equal in texture to those products made with conventional dried egg solids and at least equal in flavor and in texture to those made with fresh eggs.

A more specific object of the invention is to provide an egg yolk product high in polyunsaturates, low in saturates, and low in cholesterol content.

It is another object of the present invention to provide a practical process for manufacture of egg products whereby in most of the animal fat and cholesterol have been replaced with a vegetable oil free of cholesterol.

Still another object of the present invention is to provide a simple process for preparing an egg product wherein most of the animal fat and cholesterol have been replaced with a polyunsaturated vegetable oil free of cholesterol.

A more specific object of the present invention is to provide a dry mix wherein most of the animal fat and cholesterol have been replaced by a vegetable oil, said product being particularly suitable for use in preparing scrambled eggs, or omelets, or a variety of foods in which whole fresh eggs are conventionally used.

Other objects and advantages of the present invention will be apparent hereinafter from the specification and from the appended claims.

The single figure of drawing is a flow diagram showing one way in which a plurality of components can be combined and treated, in accordance with one embodiment of this invention, to produce substantially dry, particulate, refatted egg yolk solids, that are readily dispersible in water to form an emulsion, and that duplicates the functional properties of rehydrated conventional egg yolk solids upon heating.

No one heretofore has ever replaced the natural egg fat in egg products with a vegetable oil. Since the natural lipid-protein relationship in the egg is poorly understood, it is not surprising that others never thought to make, much less succeeded in making, such a replacement.

Polyunsaturated vegetable oils contain no cholesterol and therefore such oils are ideal replacements for the egg fat. As indicated in Table I, the yolk portion of the egg contains low levels of polyunsaturated fatty acids, moderately high levels of saturates, and an unusually high amount of cholesterol. In contrast, corn oil is high in polyunsaturates, low in saturates, and is free of cholesterol.

TABLE I.—COMPOSITION OF EGG YOLK FAT AND CORN OIL

| | Natural egg yolk | Corn oil |
|---|---|---|
| Fatty acid composition: | | |
| Saturated fatty acids, percent | 34.0–36.0 | 11.5–13.5 |
| Monounsaturated fatty acids, percent | 51.0–52.0 | 26.0–30.0 |
| Polyunsaturated fatty acids, percent | 7.0–14.0 | 53.0–56.0 |
| Polyunsaturated/saturated ratio | 0.2–0.8 | 4.5–4.8 |
| Cholesterol content, mg. percent | 3,700–7,700 | 0 |

In practicing the present invention, it is preferable to use defatted egg yolk which will accept the polyunsaturated vegetable oil in such a manner as to re-establish the original in situ relationship between egg yolk fat and egg yolk protein. The latter relationship is so poorly understood that duplication of it through replacement of egg fat with polyunsaturated vegetable oil has hitherto never been contemplated or tried.

The desired egg yolk solids which are the object of the present invention must not only have had a major part of the original egg fat replaced by polyunsaturated vegetable oil, but must also possess the following attributes under conditions of use:

(1) Dry mixes made with the refatted yolk solids must be readily dispersible (wetted) in water, preferably formin an emulsion.

(2) The egg yolk protein in the rehydrated products made with the refatted yolk solids must retain the functional characteristics of coagulating in the presence of heat without any "oiling off," "watering out," or adverse texture changes being noted in the products.

(3) The flavor of products made from refatted yolk solids must be at least equivalent to those products made with conventionally dried yolk solids and preferably equivalent to those made with fresh egg yolk.

An obvious method of attempting to add back the necessary polyunsaturated vegetable oil is to mix physically the oil with the defatted yolk solids. A product of this type, however, is found to be not readily dispersible in water, since the yolk solids are coated with fat, and furthermore, such products do not readily form an emulsion. Thus, this method is not acceptable. It was apparent that the original in situ relationship, as it existed between egg fat and egg yolk protein, had to be recreated following the add back of the polyunsaturated vegetable oil.

We discovered that the original in situ relationship between fat and protein in egg yolk could be attained by homogenizing a crude mixture of vegetable oil and an aqueous dispersion of defatted egg yolk solids. Emulsifiers are preferably added in this operation. The emulsion is then pasteurized and dried in such a way that the oil is encapsulated within an envelope of dehydrated egg yolk protein. This provides a readily dispersible refatted yolk material. These refatted yolk solids are high in polyunsaturates, low in saturates when a vegetable seed oil is used, and low in cholesterol content, yet retain all the desirable nutritional and physical attributes of egg yolk solids.

Surprisingly, the refatted yolk solids of the present invention were found to have a much better flavor than the original yolk solids. All traces of the objectionable strong egg flavor characteristic of dried egg yolk had been removed so that the delicate natural egg flavor associated with freshness is now detected. Flavor stability is extraordinary. Samples retain organoleptic acceptability after one year of storage at room temperature. Furthermore, no residual solvents can be found in the products of our invention. In contrast, conventional dry egg yolk products have objectionable odor and flavor even as freshly produced when used to make scrambled eggs.

The present invention provides a process for preparing edible refatted egg yolk solids utilizing conventional egg yolk solids from which a portion of the original fat has been removed. The defatted egg yolk solids are mixed with water and an edible vegetable oil. The mixture is then formed into an emulsion of the oil-in-water type and the emulsion is subsequently pasteurized, if necessary, and then subjected to a fast drying process. Substantially dry, particulate, refatted egg yolk solids are recovered.

The resultant substantially dry, particulate refatted egg yolk solids comprise an intimate mixture of egg yolk solids from which a substantial portion of the original fat has been removed and an edible vegetable seed oil that replaces all or at least a portion of the removed fat. These refatted solids have substantially all of the desirable functional properties of the original egg yolk solids. These functional properties which manifest upon reconstitution include emulsifying, extending, leavening, thickening, and binding characteristics as well as the ability to coagulate upon heating without "oiling off," "watering out," or exhibiting adverse texture characteristics. The dry, refatted egg yolk solids may be combined with dry egg white solids to yield a dry whole egg product having many of the characteristics of conventionally powdered whole eggs but superior flavor, storage stability, and other properties as will be described further presently.

In order to make a final product that is exceptionally palatable, of good appearance, and that can be produced by practical continuous techniques, several ingredients are incorporated in the mixture which is emulsified and subsequently dried. These ingredients will now be described in detail, and the process for making the emulsion will be described. In this description, all percentages and parts are by weight unless expressly stated otherwise.

Defatted egg yolk solids

The defatted egg yolk solids to be used in the present invention must have its protein present in non-denatured form, as indicated by a protein solubility index of 1.5 or greater as determined by the method basically described by Bishov and Mitchell, Food Research, vol. 19, pages 367–372 (1954) and discussed by Akerboom-Melnick in U.S. Pat. 2,844,470. From about 50% to about 90% of the native egg yolk fat must also have been removed from the egg yolk solids.

A typical process for making satisfactory defatted egg yolk solids involves extracting dried egg yolk solids with a non-polar solvent, preferably an aliphatic hydrocarbon solvent such as n-hexane, to remove the coalesced fat and the readily extractable cholesterol. The preferred fat-extracted egg yolk solids are substantially free of cholesterol, i.e., they contain less than 20% and more desirably less than 10% of the original native cholesterol.

The treatment of egg yolk solids with a non-polar solvent appears to disrupt the low density lipo-protein complex, and consequently extracts the triglycerides, cholesterol and, to some extent, the other lipid materials. Because of the nature of this extraction, it has been found desirable to add an emulsifying agent when refatting the extracted, defatted egg yolk solids.

The emulsifying agent

It is important that the emulsion be of the oil-in-water, rather than the water-in-oil type. An emulsifier that is either water dispersible or water soluble, hereinafter called the "water soluble" type, will favor such an emulsion. Obviously, of course, such an emulsifier must be edible. The emulsifier may be added to the vegetable oil if it is also dispersible; otherwise, it should be added to the water in which the defatted yolk solids are hydrated. It may be desirable to use more than one emulsifier. Surprisingly good emulsions of the oil-in-water type can still be made on adding a vegetable seed oil without benefit of added emulsifiers to the hydrated defatted yolk solids described above. The defatted yolk solids were obtained by a process which leaves behind with the egg yolk portion, a very large portion of the phospholipids while most of the fat is extracted.

Such resulting emulsions provide after spray drying acceptable refatted egg yolk solids for many applications, such as in cake and custard formulations. However, emulsifiers are preferably added in making the refatted egg yolk solids of the present invention if such are to be used in making mixes for producing scrambled eggs or omelets.

The following emulsifiers of the water soluble type have been found to be particularly suitable as a surface active agent which performs the primary function of providing sufficient dispersive forces to the fat globules to effect gravitational stability of the finished emulsion. It has also been observed that this kind of emulsifying agent works in conjunction with the small amount of the residual egg fat, still in lipo-protein combination, in the novel defatted yolk solids.

(1) Water-soluble and water-dispersible emulsifiers containing polyoxyethylene chain(s) such as the partial fatty acid esters of polyhydric alcohols containing at least one polyoxyethylene chain, complete fatty acid esters of the condensation products of polyhydric alcohols and ethylene oxide in which all of the hydroxyl groups of the alcohols contain polyoxyethylene chains, partial fatty acid esters of polyoxyethylene glycol and complete fatty acid esters of polyoxyethylene glycol, the oxyethylene units per mol of each of said members being at least five and each fatty acid group in said members containing at least twelve carbon atoms. More specific examples of these emulsifiers are the partial fatty acid esters of polyoxyethylene sorbitan such as polyoxymethylene(20) sorbitan monostearate (also known as Polysorbate 60). These compounds are water-soluble, hydrophilic emulsifiers, and are readily available commercially.

(2) Certain commercial grades of glyceryl esters, particularly commercially available glyceryl mono-oleate, which is essentially a blend of glyceryl mono-oleate, glyceryl dioleate and potassium oleate. Such a product is sold by Glyco Chemical Company as "S–1787." The emulsifier is oil-soluble and water-dispersible, the potassium oleate fraction being water-soluble.

(3) Potassium oleate itself has been found to be effective as the emulsifying agent.

(4) Diacetyl tartaric acid esters of mono- and diglycerides of fat-forming fatty acids: A commercially available product of this type is sold by Hachmeister, Inc., under the trade name TEM 4T. It consists of diacetyl tartaric acid esters of mono- and diglycerides of stearic and palmitic acids, and contains about 51% by weight hydrophilic and 49% lipophilic groups. The emulsifier dissolves in oil and is readily dispersible in water.

(5) Commercial soybean lecithin, which is a naturally occurring mixture of similar compounds identified as phosphatides or phospholipids, namely, lecithin (phosphatidyl choline) cephalin (phosphatidyl ethanolamine), lipositol or inositol phosphatides (phosphoinositides) and related phosphorus-containing lipids. One such product, manufactured by Yelkin Chemical Co. under the trade name "BTS," contains from 54% to 72% phosphatides dissolved in soybean oil. This product is soluble in oil and dispersible in water.

(6) Split lecithins, which are soluble in oil and dispersible in water. These are commercial lecithin products which have had the ratio of phosphatides changed in order to accentuate their separate emulsifying and surface active properties. These products are available commercially.

(7) Several mixtures and combinations of emulsifiers may also be used. A commercially available product is a blend of three parts glyceryl mono-stearate and one part stearyl-2-lactylic acid.

(8) A phosphated mono- and diglyceride, preferably as the sodium salt. An acceptable product is sold by the Witco Chemical Company, Inc., under the trade name Emcol–D–7031.

The above emulsifiers are preferably added to the oil phase with the exception of the potassium oleate and the sodium salts of the phosphated mono- and diglycerides. These latter emulsifiers are so preferentially water-soluble that they are added to the water in which the defatted egg yolk solids are dispersed.

The phosphated mono-diglyceride, which is hot water soluble, is the preferred emulsifier. Included in the removal of the easily extractable fat from conventional egg yolk solids, are portions of lecithin and lysolecithin which are the major components of egg phospholipids. A replacement of the extracted lecithins with a commercial soybean or split lecithin considerably improves the texture of the cooked egg products but can result in a less acceptable product due to the emergence of the characteristic lecithin flavor. It was found that, if a phosphated mono-diglyceride was substituted for the lecithin, the texture of the finished product was equivalent to the product which contained lecithin.

It is preferred to use a combination of three different kinds of emulsifiers. For example, a combination of phosphated monodiglyceride, glyceryl mono-oleate and polyoxyethylene(20) sorbitan monostearate (Polysorbate 60) has been found to be an excellent blend of emulsifying agents.

The amount of emulsifying agent that is used depends upon many factors, such as, for example, the type of or mixture of individual emulsifiers used, the relative proportions of solids, oil and water used, the time lag between emulsification and drying, the desired "tightness" of the emulsion, the kind of drying to be employed, the amount of emulsifier already present in the added vegetable oil, if any, and so on. Generally, the greater the proportion of oil present in the mixture that is to be emulsified, the greater the amount of emulsifying agent that is required. About 0.25% by weight of the total emulsion or about 0.75% in terms of total solids, approaches the lower limit for a preferred emulsion of adequate stability to produce a preferred finished product. Such emulsion has the following general composition:

| Ingredient: | Parts |
|---|---|
| Dried defatted yolk solid | 100 |
| Vegetable oil | 40–230 |
| Water | 100–800 |

The amount of emulsifying agent can be increased substantially without deleterious effect, but of course, at added expense and with the possibility of being detected by flavor. With the preferred mixture of emulsifiers, about 0.8% of the emulsifying mixture is excellent for emulsions with even a high vegetable oil content. With the less-preferred emulsifiers, amounts as high as 2.5% may be used.

The vegetable oil

The edible vegetable oil used may be any edible digestible oil, free of cholesterol and one that is normally liquid or partially liquid at room temperature. Such oils are preferably the polyunsaturated vegetable seed oils such as corn oil, cottonseed oil, soybean oil, safflower oil, sunflower seed oil, rice bran oil, and sesame seed oil. Vegetable seed oils such as peanut oil likewise give excellent products as do the partially hydrogenated vegetable seed oils; they differ only in providing less polyunsaturates. Even the vegetable oils of the coconut oil type, which are also free of cholesterol, may be used to provide egg products substantially free of cholesterol and organoleptically highly acceptable.

The edible oil content of the refatted egg yolk product will depend upon the residual fat content of the defatted yolk solids, as well as upon the amount of oil that is used for refatting. Preferably, from about 50% to about 90% of the native egg yolk fat will have been removed from the egg yolk solids during the defatting process. The defatted yolk solids then contain from about 50% to about 10% of the original native fat.

Generally, for each 100 parts of defatted yolk solids, it is desirable to use 40–230 parts of vegetable oil and preferably 80–120 parts. This provides products varying in total fat content of from about 35% to about 80% on a total solids basis and preferably from about 45% to about 70% and most desirably from about 55% to about 65% to approximate the normal fat content of conventionally dried egg yolk solids.

The original fat in the egg yolk solids is replaced by a vegetable oil, preferably a vegetable seed oil in an amount between about 10% and about 70% by weight of the refatted egg yolk solids. The minimum amount of oil added is that required to impart good eating qualities to the egg product when used to prepare scrambled eggs. Whereas all of the products of the present invention are greatly reduced in cholesterol content, at least a 50% reduction, only those made with the vegetable seed oils will provide a product of increased polyunsaturated and reduced saturated fatty acid content. The preferred products of this invention will have a ratio of polyunsaturated to saturated fatty acid content in excess of 1.0 and desirably in excess of 2.0.

Coloring agent

Beta carotene is a preferred colorant; however, annatto coloring or any edible colorant which will impart an attractive yellow appearance to the refatted product can be used if desired.

Flavoring agent

The preferred flavoring material is salt. It can be added either with the defatted egg yolk solids or to the water when preparing the emulsion or to the refatted egg yolk solids after spray drying.

Since the presence of salt improves the spray drying operation by increasing the percentage of the non-fat solids, the salt is preferably added to the emulsion in amounts to taste generally 0.25% to 2% by weight of the emulsion. This is equivalent to 0.75% to 6% in terms of the dehydrated refatted egg yolk solids. Other flavorant materials, such as cheese, pepper, ground dried vegetables, monosodium glutamate, and the like, may also be added at some appropriate stage. No salt is added in preparing products for those on a salt-free diet.

Aqueous component

The aqueous component of the emulsion is essentially potable water. The amount used in preparing the emulsion can be adjusted to process needs and may vary from 40% to 85% of the emulsion, preferably about 60% to about 70%, i.e. about 30% solids in the preferred emulsion. For spray drying, the amount of water to be used in the emulsion is a function of the type of spray dryer utilized. Water contents in the emulsion as high as the 85% indicated above have been used with good results. The reasons for avoiding high water contents are economic rather than technical.

It is preferred to incorporate into the aqueous phase a small amount, up to 1% by weight of the emulsion, of material such as a phosphated mono-diglyceride or lecithin. This material is a desirable additive, since it imparts proper texture characteristics to cooked egg foods made with the end products of this invention.

pH adjustment

Before drying, the pH of the aqueous suspension in the mixture is preferably adjusted to a range of 7 to 8, most desirably to 7.5. This can be accomplished by the addition of alkalizing materials such as alkaline sodium phosphate or sodium hydroxide. Alternatively, these alkalizing materials and others, such as baking soda, potassium bicarbonate and sodium bicarbonate, may be added to the dried refatted yolk solids, so that upon rehydration, the resulting emulsion will have a pH in the range of 7 to 8, most desirably at about 7.5.

If the prepared emulsion is to be held for any length of time, either before or after pasteurizing, it should be chilled to a temperature below 45° F. because of the danger of microbial growth.

After the refatted, low cholesterol yolk emulsion is pasteurized (when such is called for), it is preferably spray dried, to reduce the moisture content to 5% or less. The inlet temperature of the dry air may range from 275° F. to 400° F. and the outlet air temperature may range from 150° F. to 175° F. Under these specified conditions, the temperature of the solids should not be greater than 150° F. Alternatively, any other suitable method of drying may be used, with or without pre-freezing before drying.

The defatted egg yolk material used in the present invention may have residual solvent up to an amount of about 150 parts per million, or even higher. It has been noted that during the refatting and spray drying operation in accordance with the present invention, the solvent is removed so that the final refatted material contains less than 10 p.p.m. In fact, it has not been possible organoleptically to find even trace amounts of solvent in the material. However, analytical procedures permit a detection of only about 10 parts per million. Since none was detected it may be accurately stated that the material contains less than 10 parts per million, which is less than an insignificant trace quantity.

The dry, refatted yolk solids are in the form of discrete particles. This product, when mixed with dried egg whites and/or other materials, as described in Example 5, reconsitutes readily with water and upon cooking provides an excellent scrambled egg or omelet but now one that can be included in diets designed to control the serum cholesterol level.

To obtain a more free-flowing product up to 2%, by weight, of an anticaking agent may be added to the dry refatted, low-cholesterol yolk solids. Typical examples of anticaking agents include sodium aluminum silicate, sodium silicate, tricalcium phosphate, granular silica gel, and the like.

To provide a better understanding of the present invention with regard to the novel products obtained and processes employed, reference will now be made to the following specific examples.

EXAMPLE 1

As shown in the drawing, it is preferable to premix the constitutents in groups and then form the desired emulsion which is subsequently spray dried. The ingredients used in this example are set forth below in these premixed groups. The first group is the oil constituent, the colorant, and the oil emulsifiers. Group 2 constituents the dry ingredients and Group 3 the aqueous component including its emulsifier. The quantities of the ingredients appear hereafter.

| Ingredient | | Parts |
|---|---|---|
| Group 1 | Corn oil | 16.4 |
| | Polyoxyethylene (20) sorbitan monostearate | 0.2 |
| | Glyceryl mono-oleate | 0.3 |
| | B-carotene concentrate (equivalent to 500,000 USP units of vitamin A per gm.) | 0.005 |
| Group 2 | Defatted yolk solids (11.1% residual native fat and 0.53% cholesterol; protein solubility index of 1.8).[1] | 14.7 |
| | Salt | 1.1 |
| Group 3 | Water | 67.0 |
| | Phosphated mono-diglyceride | 0.3 |

[1] Percentages are based on original product before defatting.

The mixture of all three groups was placed in a single mixing tank, aqueous component first (Group 3), then the solids (Group 2). This solution was mixed thoroughly until all of the dry material was dispersed, then the oil phase (Group 1) was added gradually with vigorous mixing. The premix was fed through a colloid mill, with the gap setting between rotor and stator at 6 mils. The resulting emulsion was pasteurized at 143° F. for 3½ minutes, then chilled to 45° F. until it was spray dried. The emulsion was spray dried in a spray dryer with an inlet dry air temperature of 350° F. and an outlet air temperature of 160° F.

The resulting dry, refatted, low-cholesterol yolk solids were in the form of discrete particles. Silica gel, 0.5% by weight, was added to improve the flow characteristics, and 2.0% sodium bicarbonate was added to adjust the pH upon rehydration to between 7.0 and 8.0. The pH adjustment may be made earlier in the process as shown in the drawing using a dilute sodium hydroxide solution. The moisture content of the product was 2.6%.

The defatted egg yolk material used in this example exhibited a solvent content of approximately 150 parts per million. After refatting the final product was analyzed for solvent content. The results were less than 10 parts per million, i.e. no trace.

In Table II, the chemical composition of the refatted egg yolk solids of Example 1 is compared with that of a typical sample of conventional stabilized egg yolk solids. The cholesterol content of the refatted egg yolk solids of this example was 410 milligrams per 100 grams of product, as compared to a cholesterol content of 2980 milligrams per 100 grams in conventional dry egg yolk solids.

The total fat content of these dry egg yolk solids was 59.5%, as compared to 57.6% typically found in conventional dried egg yolk solids.

The ratio of polyunsaturated to saturated fat in the product of this example was 3.0. The ratio of polyunsaturated to saturated fat found in a typical sample of conventional dry egg yolk solids was 0.4. Table II illustrates the composition of the refatted, low-cholesterol yolk solids in comparison to conventional egg yolk solids.

TABLE II.—COMPOSITION OF CONVENTIONAL STABILIZED EGG YOLK SOLIDS AND REFATTED EGG YOLK SOLIDS

| | Conventional, stabilized egg yolk solids | Refatted egg yolk solids |
|---|---|---|
| Total fat, percent | 57.6 | 59.5 |
| Fatty acid composition saturated fatty acids, percent total fat | 34 | 17.6 |
| Monosaturated fatty acids, percent total fat | 52 | 29.2 |
| Polyunsaturated fatty acids, percent total fat | 14 | 53.2 |
| Polyunsaturated/saturated ratio (P/S ratio) | 0.4 | 3.0 |
| Protein, percent | 33.4 | 27.7 |
| Cholesterol, percent | 2.98 | 0.41 |
| Moisture, percent | 4.8 | 2.6 |

The refatted, low-cholesterol yolk solids from Example 1 may be used as a replacement for conventional egg yolk solids, or when rehydrated in a 1:1 ratio with water, as a replacement for fresh liquid egg yolk.

After storage for one year at room temperature in a closed container with air in the headspace, the products of this example exhibited no deterioration. In fact, no detectable differences from freshly prepared products were observed.

The following table illustrates additional examples embodied in this invention. Following this table are further details concerned with the preparation of Example 2–4.

TABLE III.—ADDITIONAL EXAMPLES OF COMPONENTS OF REFATTED, LOW CHOLESTEROL EGG EMULSIONS

| | Parts | | |
|---|---|---|---|
| Ingredient | Ex. 2 | Ex. 3 | Ex. 4 |
| Water | 70.0 | 65.0 | 80.0 |
| Defatted, low-cholesterol egg yolk solids (10% residual native fat and 0.41% cholesterol; protein solubility index of 1.8)[1] | 12.0 | 14.7 | 7.5 |
| Salt | 1.0 | 1.1 | 0.7 |
| Corn oil | 17.1 | 17.2 | 10.8 |
| Phosphated mono-diglyceride | | | 0.3 |
| Lecithin | 0.5 | | |
| Sodium hydroxide | 1.6 | | 1.0 |
| Glyceryl mono-oleate | 0.3 | | 0.2 |
| Polyoxyethylene (20) sorbitan monostearate | 0.5 | | 0.3 |
| B-Carotene concentrate (equivalent to 500,000 U.S.P. units of vitamin A per gm.) | 0.005 | 0.005 | 0.005 |
| Egg white solids | | | 8.5 |
| Non-fat milk solids | | | 3.3 |
| Guar gum | | | 0.5 |

[1] Percentage is based on original product before defatting.

EXAMPLE 2

Water, defatted, low-cholesterol egg yolk solids, corn oil, emulsifying agents, lecithin, sodium hydroxide, salt, and B-carotene were combined in the proportions set forth in Table III and treated as in Example 1, with the lecithin and sodium hydroxide being incorporated in Group 3. The resulting product was dispersible in water, and as in Example 1, exhibited the characteristics of natural dried egg yolk solids. When combined with the proper proportion of egg white solids, the resulting product was a satisfactory replacement for whole egg solids.

When mixed in proper proportions with the omelet mix ingredients in Example 5, then reconstituted and cooked as either an omelet or scrambled eggs, the resulting product was very satisfactory with acceptable flavor and excellent texture.

EXAMPLE 3

Water, defatted, low-cholesterol egg yolk solids, corn oil, salt and B-carotene, were combined in the proportions set forth in Table III and treated as in Example 1. The resulting product was completely dispersible in water and exhibited the characteristics of natural spray dried egg yolk solids. When combined with the proper proportions of egg white solids, the product was a satisfactory replacement for whole egg solids. When mixed in proper proportions with the omelet mix ingredients in Example 5, then reconstituted and cooked as either an omlet or scrambled eggs, the resulting product was very satisfactory, with excellent flavor and acceptable texture.

EXAMPLE 4

In this example, water, defatted, low-cholesterol egg yolk solids, corn oil, egg white solids, non-fat milk solids, salt, emulsifiers, sodium hydroxide, guar gum, and B-carotene were combined in the proportions shown in Table III, and processed to a dry mix as described in Example 1. The sodium hydroxide was incorporated in the aqueous component (Group 3), while the egg white solids, guar gum, and non-fat milk solids were incorporated in Group 2. When the resulting product was blended with the other dry ingredients shown in Example 5, rehydrated and cooked, the result was scrambled eggs or omelets of exceptional flavor and quality.

Dry refatted whole egg solids, prepared by mixing the refatted egg yolk solids from any of the previous examples, with dry egg white solids in the natural proportion of 71.5% yolk solids to 28.5% white solids duplicates, upon rehydration, the functional properties of conventional dried and rehydrated whole egg solids. The refatted, dry whole egg solids can be rapidly and efficiently dispersed in a liquod media, e.g. water, milk, or other edible liquids commonly used to rehydrate dried eggs.

When the refatted egg yolk solids, from any of the previous examples, were mixed with dry egg white solids in certain proportions and substituted for whole eggs in preparing many food items, i.e. waffles, biscuits, French toast, pound cake, and pancakes, products were obtained which were superior in taste and texture to similar products made with conventional whole egg solids. From the nutritional standpoint, all of these food products had the advantage of a much lower cholesterol content and a much higher ratio of polyunsatuartes to saturates, as compared with the same products made with whole eggs or conventional whole egg solids (see Table II).

For direct consumption, the refatted yolk solids of this invention, with pH values of 7.0–8.0, are combined with dried egg whites, admixed with the proper proportions of non-fat milk solids, vegetable gum, a leavening agent, sugar and spices, and mixed with water (1 part egg product plus 3–4 parts water) to form an emulsion with a consistency like liquid whole eggs. The emulsion is then cooked in the same manner as scrambled eggs. After cooking, the product resembles conventional scrambled eggs, but has a flavor superior to scrambled eggs prepared from conventional whole egg solids.

Thus, another aspect of this invention is the embodiment of the refatted, low-cholesterol yolk solids with other ingredients which will, upon rehydration and cooking, result in a product which resembles scrambled eggs or omelets, depending on the method of cooking, but has a flavor superior to similar products prepared from conventional dry whole eggs and equal to that of fresh eggs.

The refatted, low-cholesterol egg yolk solids may be present in the scrambled egg-omelet mix in the range of 50% to 68%. Amounts above and below this range may result in a product inferior in flavor and texture characteristics, although they may still be acceptable.

The dry egg white is preferably spray dried. The amount of added egg white powder will correspond generally to the proportion of 30–80 parts of egg white solids to 100 parts of refatted, low-cholesterol egg yolk solids. The normal proportion is about 40 parts of egg white solids to 100 parts of the refatted, low-cholesterol egg yolk solids. The higher levels of egg white solids contribute to a more cohesive coagulum on frying a rehydrated omelet mix.

The addition of non-fat milk solids enhances the color the improves the texture of the reconstituted whole egg product upon cooking as either an omelet or scrambled eggs. The amount of non-fat milk solids in the product may range from 5 to 15 percent.

The incorporation of a leavening agent improves the lightness of texture of the reconstituted cooked product. The omelet can contain as much as 1.5% of leavening material, depending upon the agent used or it may be omitted entirely.

Minor amounts of vegetable gum may be incorporated in the mix. Suitable gums include guar gum, cellulose gum, gum tragacanth, and gum arabic. These materials aid in water absorption upon reconstitution and also add desired body to the product. They are preferably present in amounts from 0.5 to 2.5%, depending upon the type of vegetable gum.

The reconstituted omelet mix should have a pH in the range of 7–8, preferably 7.5. To attain a pH in this range, a suitable alkalizing agent, such as sodium bicarbonate, potassium bicarbonate, sodium carbonate, or the like is added with the other dry ingredients of the omelet mix, if an alkalizing agent has not previously been added during the preparation of the refatted, low-cholesterol egg yolk solids. The proper pH will improve the texture of the reconstituted cooked product. The omelet mix will generally require from 1 to 4% alkalizing agent, depending upon the initial pH and the material used.

From 1.0 to 2.0% sugar and/or spices may be added to enhance the egg flavor.

EXAMPLE 5

This example is one formulation which may be used in preparing a scrambled egg or omelet mix using the refatted low-chloesterol egg yolk solids of this invention. A quantity of spray dried, refatted, low-cholesterol egg yolk solids, as prepared in Example 1, was blended with other dry constituents in the amounts set forth in the following table.

TABLE IV

| Constituents: | Percent by weight |
|---|---|
| Refatted, low-cholesterol yolk solids, (Example 1) | 65.0 |
| Powdered egg white | 24.2 |
| Non-fat milk solids | 7.2 |
| Baking powder | 0.8 |
| Guar gum | 1.6 |
| Sugar, spices | 1.2 |
| | 100.0 |

The product was readily reconstituted with suitable quantities of water, milk, skimmed milk, or mixtures thereof. After reconstitution with water, the egg product was poured into a pan having a small amount of melted fat and was cooked in the conventional manner for a minute or so. This time compared favorably with that required for the scrambling of fresh eggs.

To obtain the equivalent of one liquid egg, about 16 grams of the dry egg product were added to about 60 grams of water (¼ cup). The finished omelet or scrambled egg duplicated the texture and color of similar products made with conventional dry whole egg solids, but possessed a superior flavor like that of fresh eggs.

The cholesterol content of the rehydrated whole egg product was about 57 milligrams per 100 grams of total product, including the reconstituting liquid, as compared to about 540 milligrams per 100 grams of liquid whole egg.

The fat content of the rehydrated whole egg product was similar to that of whole eggs; however, the $P/S$ ratio of the fat was in excess of 2.

It has been shown through this invention how a refatted, low-cholesterol egg yolk material which is high in polyunsaturates, low in saturates, and possesses outstanding storage stability, can be produced. This material can be used, without the addition of other ingredients, as a replacement for either liquid egg yolks or conventionally dried egg yolk solids in recipes and in other food formulations. With the addition of the proper amount of egg white solids, this material may be used as a replacement for either whole eggs or conventionally dried whole egg solids.

It has been pointed out throughout this application that the refatted, low-cholesterol egg yolk solids can be used in making formulated food products with high convenience. Such modified yolk solids can be formulated with other ingredients to produce a convenient, dry omelet mix which, when reconstituted and cooked, results in a superior scrambled egg or omelet product.

Yet another use for the refatted, low-cholesterol egg yolk solids of this invention is in the preparation of commercially formulated convenience foods which would provide all the functional and nutritional benefits associated with the presence of egg yolk solids, in addition to providing a superior egg flavor and outstanding storage stability.

Following are examples of some formulated food products for consumer use, made with the refatted, low-cholesterol egg yolk solids of this invention.

EXAMPLE 6

Instant custard mix

Refatted, low-cholesterol egg yolk solids, as prepared in Example 1, sugar, calcium carageenan, tetrasodium phosphate, salt, and flavoring and coloring agents, were mixed together in the proportions shown below. When packaged, the product was readily dispersible and had excellent storage stability without degradation of quality.

To prepare the instant custard, 2 ounces of this mix was added to 1 cup of milk and heated to boiling, with stirring. The mixture was then removed from the heat, poured into custard dishes and allowed to cool. Upon cooling, the product set up to a custard-like consistency and possessed good flavor.

TABLE V

| Ingredient: | Parts |
| --- | --- |
| Sugar | 55.0 |
| Refatted, low-cholesterol egg lok solids (Example 1) | 10.0 |
| Calcium carageenan | 1.5 |
| Tetrasodium phosphate | 0.6 |
| Salt | 0.3 |
| Flavoring and coloring agents, as required. | |

EXAMPLE 7

Instant breakfast drink

The refatted, low-cholesterol yolk solids, as prepared in Example 1, were mixed with sugar, non-fat milk solids, egg whites, calcium carageenan, vitamins, mineral supplements, flavoring and coloring agents in the proportions shown below. The resulting mix was readily dispersible and had excellent storage stability with no degradation in quality.

This product was made into a nutritious, satisfying drink almost immediately by adding 1½ ounces of the dry mix to 1 cup (8 ounces) milk and stirring until dissolved, about 30 seconds.

TABLE VI

| Ingredients: | Parts |
| --- | --- |
| Refatted low cholesterol yolk solids (Example 1) | 10.0 |
| Sugar | 10.0 |
| Non-fat milk solids | 10.0 |
| Egg white solids | 4.0 |
| Calcium carageenan | 0.25 |

The flavoring agents, coloring agents, vitamins and minerals are added in standard proportions such that the desired flavor and color and nutritional value are attained. Such flavoring agents as strawberry, chocolate, and coloring agents such as red, brown, yellow, etc. are incorporated as desired for the specific formulation.

Other uses for the refatted egg yolk products of the present invention include food products such as mayonnaise, spongecake, salad dressings, and the like. Whether or not the refatted egg yolk solids are combined with dry egg white is dependent upon the desired final product. The egg yolk solids of the present invention may be combined with egg white in dry form in any proportion desired. The egg products of this invention are also of value in the form of aqueous slurries, distributed in a refrigerated state every few days to the institutional trade.

While the invention has been described in connection with specific embodiments thereof, it will be understood that it is capable of further modification and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

We claim:

1. A process for preparing refatted egg yolk solids from yolk solids from which at least 50% up to about 90% of the original fat has been removed, comprising:
    forming an emulsion of the oil-in-water type from a mixture comprising between about 40 and about 230 parts of an edible vegetable oil, about 100 parts of fat-extracted egg yolk solids, and about 100 to about 800 parts of water;
    drying the emulsion for a period of time sufficient to reduce the moisture content to less than about 5%; and
    recovering substantially dry refatted egg yolk solids.

2. A process as in claim 1 wherein the mixture includes a minor portion of beta carotene as a coloring agent.

3. A process as in claim 1 wherein the mixture includes a minor portion of salt as a flavorant.

4. A process as in claim 1 wherein the edible vegetable oil is high in polyunsaturates, having a polyunsaturate-to-saturate ratio greater than 1.0.

5. A process as in claim 1 wherein the fat-extracted egg yolk solids are substantially free of cholesterol.

6. A process as in claim 1 wherein the edible vegetable oil is present in an amount between about 80 and about 120 parts.

7. A process as in claim 1 wherein the water is present in an amount to provide an emulsion containing about 30% to about 40% total solids.

8. A process in accordance with claim 1 wherein water comprises at least 40% by weight of the emulsion, and the drying process comprises spray drying.

9. A process in accordance with claim 1 wherein the vegetable oil is corn oil.

10. A process in accordance with claim 1 wherein said mixture comprises at least one edible emulsifier of the water-soluble type.

11. Particulate, refatted egg yolk solids made by the process of claim 1 and comprising in intimate admixture:
    egg yolk solids from which a substantial portion but less than about 90% of the original fat has been removed, and
    an edible vegetable seed oil replacing at least a portion of the removed fat.

12. A product in accordance with claim 11 wherein the vegetable seed oil is characterized by a ratio of polyunsaturates to saturates that is greater than 1.0.

13. A product in accordance with claim 12 wherein the oil comprises corn oil.

14. A product in accordance with claim 11 that also comprises, in intimate admixture, at least one flavorant and a coloring agent.

15. A product in accordance with claim 11 that includes a minor amount of at least one edible emulsifier of the water-soluble type.

16. A product in accordance with claim 15 wherein the emulsifier comprises polyoxyethylene(20) sorbitan monostearate.

17. A product in accordance with claim 16 wherein the emulsifier also comprises glyceryl mono-oleate.

18. Particulate, substantially dry refatted egg yolk solids as in claim 11 wherein the fat content has a polyunsaturated to saturated fat ratio of at least about 1.

19. The product of claim 18 wherein the ratio is at least about 2.

20. A process for preparing refatted egg yolk solids from yolk solids from which at least 50% up to about 90% of the original fat has been removed, comprising:
    mixing together between about 40 and about 230 parts of an edible vegetable oil, about 100 parts of the fat-extracted egg yolk solids, and water in sufficient quantity that the mixture contains at least 40% by weight of water;
    forming the mixture into an emulsion of the oil-in-water type;
    subjecting the emulsion to a spray drying process; and
    recovering substantially dry refatted egg yolk solids.

21. A process as in claim 20 wherein the edible vegetable oil is corn oil.

22. A process as in claim 20 wherein a phosphated monodiglyceride is a component of the original mixture.

23. A process in accordance with claim 20 wherein at least one flavorant and at least one coloring agent are included as components of the original mixture.

24. A process for preparing readily wettable, dry refatted egg yolk solids from yolk solids from which at least 50% up to about 90% of the original fat has been extracted, comprising:

mixing together from about 40 to about 230 parts of an edible vegetable oil, at least one edible emulsifying agent of the water-soluble type, salt, about 100 parts of the fat-extracted yolk solids, and water in sufficient quantity to form at least 40% by weight of the mixture;

forming this mixture into an emulsion of the oil-in-water type;

pasteurizing the emulsion;

spray drying the emulsion under conditions such that substantially no protein denaturation occurs to reduce the moisture content to less than about 5%, and recovering substantially dry, free-flowing, discrete particles of refatted egg yolk solids.

25. A process in accordance with claim 24 wherein the vegetable oil comprises corn oil.

26. A formulated food product having, as an ingredient thereof, particulate, refatted egg yolk solids comprising, in intimate admixture:

100 parts of egg yolk solids from which a substantial portion up to about 90% of the original fat has been removed, and from about 40 parts to about 230 parts of an edible vegetable seed oil replacing at least a portion of the removed fat, said product having been prepared by drying an emulsion of the oil, water and egg yolk solids.

27. A food product in accordance with claim 26 wherein the food product is a mix for a scrambled egg or omelet.

28. A food product in accordance with claim 26 wherein the food product is a custard mix.

29. A food product in accordance with claim 26 wherein the food product is an instant breakfast drink.

References Cited

UNITED STATES PATENTS

| | | | |
|---|---|---|---|
| 3,114,645 | 12/1963 | Blanken et al. | 99—210 |
| 3,207,609 | 9/1965 | Gorman et al. | 99—114 |
| 3,397,994 | 8/1968 | Elenbogen et al. | 99—116 |

FOREIGN PATENTS

| | | | |
|---|---|---|---|
| 803,071 | 10/1958 | Great Britain | 99—113 |

MORRIS O. WOLK, Primary Examiner

W. BOVEE, Assistant Examiner

U.S. Cl. X.R.

99—113, 114